Nov. 5, 1929. C. N. MONTEITH ET AL 1,734,526
COWLING PIN
Filed Oct. 17, 1927

INVENTOR
Charles N Monteith
Frank A Walloch

Patented Nov. 5, 1929

1,734,526

UNITED STATES PATENT OFFICE

CHARLES N. MONTEITH AND FRANK A. WALLOCH, OF SEATTLE, WASHINGTON, ASSIGNORS TO BOEING AIRPLANE COMPANY, OF SEATTLE, WASHINGTON

COWLING PIN

Application filed October 17, 1927. Serial No. 226,778.

This invention relates to fastening devices and more particularly to cowling safety pins, used in airplane construction, and has for its principal object to provide a pin of this nature which engages with each individual post separately, that is to say, each post has its own individual pin, and each pin is removably secured to the cowling at a point near the post. By this arrangement the cowling may be fastened or loosened in a more expeditious manner than heretofore possible with the old type of pins, which were formed of a single length of wire adapted to be threaded through the posts, which was a slow process, and in the event of losing the pin, none of the posts could then be dealt with.

Another feature of our improved form of pin is its new and novel formation whereby spring tension is applied to the cowling by the body of the pin when in a locked position, thereby causing the cowling to be held firmly against its support at each point of fastening.

These and other objects will appear as our invention is more fully hereinafter described in the following specification, illustrated in the accompanying drawings, and finally pointed out in the appended claim.

Figure 1:
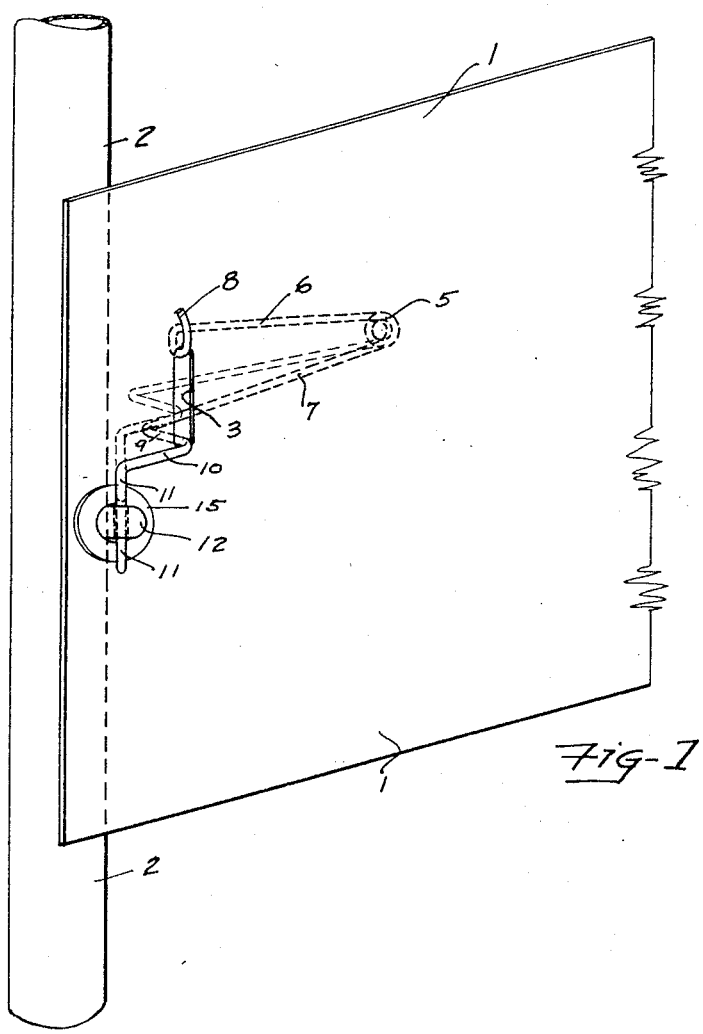
Figure 1 is a perspective view showing our improved form of pin in operative engagement with a fragment of cowling material attached to its support through the medium of a usual post.
Figure 2:
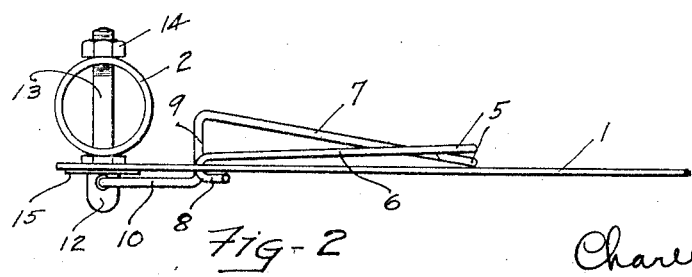
Figure 2 is a plan view of Fig. 1.

Referring now more particularly to the drawings:

Reference numeral 1 indicates a fragment of a usual piece of cowling material formed of duralumin, aluminum, or any other sheet metal commonly used in the aircraft industry. 2 indicates a supporting member for the cowling which may be any part of the fuselage of the airplane or any other part to which it may be desired to secure cowling. 3 indicates an elongated aperture formed in the cowling, within which is removably secured our new and improved form of pin, which consists of a main body member of bifurcated formation and formed of spring wire. The innermost end of the main body member is formed into a coil spring 5, from which extend outwardly in the same general direction a pair of members, 6 and 7. The outermost end of the member 6 is hook shaped as indicated at 8, to engage with the upper end of the elongated aperture 3 in the cowling, while the lower member 7 is bent at right angles to the cowling as at 9 so as to pass through and bear against the lower edge of the elongated aperture 3, under spring tension. The member 7 is bent at right angles to the portion 9 in the same horizontal plane as at 10. Finally, the outermost end of the member 7 is turned downwardly as at 11 to form a pin for operative engagement with a usual post 12, which is secured to the supporting member 2 by means of its reduced and threaded portion 13 passing through an aperture in the supporting member 2 and receiving a nut 14. The post 12 and the reduced and threaded portion 13 are integral with each other, having been machined out of one piece of material. 15 indicates a usual grommet surrounding an aperture in the cowling through which the post is adapted to pass.

When it is desired to remove the pin 11 from the post 12 the operator merely compresses the members 6 and 7 towards each other as shown in their dotted line positions in Fig. 1, until the pin has cleared the post. The cowling is then free to be removed from the post and when the pin is released it will securely fasten itself in the elongated aperture 3, which insures against loss of the pin, and provides a permanent attachment of the pin to the cowling, which heretofore has not been done.

While we have shown a particular form of embodiment of our invention, we are aware that many minor changes therein will readily suggest themselves to others skilled in the art, without departing from the spirit and scope of our invention.

Having thus described the invention, what we claim as new and desire to protect by Letters Patent is:

A cowling pin of the class described, comprising a main body member of substantially U shaped formation, the closed end of which terminates in a spring member, one of the opposite and open ends of the U shaped member being formed into a hook for engagement under spring tension with one end of a radially disposed slot in the cowling, the other of said open ends being turned outwardly through said cowling slot thence forwardly and downwardly, the outwardly turned portion bearing against the other end of said cowling slot and the downwardly turned portion engaging with a cowling post by extending through an aperture therein, said cowling post being secured to a structural member of the airplane and extending through an aperture in said cowling, In testimony whereof we affix our signatures.

CHARLES N. MONTEITH.
FRANK A. WALLOCH.